United States Patent [19]
Welch et al.

[11] Patent Number: 6,153,716
[45] Date of Patent: Nov. 28, 2000

[54] POLYETHYLENES CONTAINING A UNIQUE DISTRIBUTION OF SHORT CHAIN BRANCHING

[75] Inventors: M. Bruce Welch, Bartlesville, Okla.; Helmut G. Alt, Bayreuth; Bernd Peifer, Marl, both of Germany; Syriac J. Palackal, Bartlesville; Gary L. Glass, Dewey, both of Okla.; Ted M. Pettijohn, Longview, Tex.; Gil R. Hawley, Dewey; Darryl R. Fahey, Bartlesville, both of Okla.

[73] Assignee: Phillips Petroleum Company, Bartlesville, Okla.

[21] Appl. No.: 09/204,635

[22] Filed: Dec. 2, 1998

Related U.S. Application Data

[63] Continuation of application No. 08/753,973, Dec. 4, 1996, abandoned, which is a continuation-in-part of application No. PCT/US96/13000, Aug. 8, 1996, which is a continuation-in-part of application No. 08/515,498, Aug. 15, 1995, which is a continuation-in-part of application No. 08/252,611, Jun. 1, 1994, Pat. No. 5,498,581.

[51] Int. Cl.$^7$ .................................................. C08F 110/02
[52] U.S. Cl. ........................ 526/352; 526/348.6; 526/943
[58] Field of Search ................................ 526/348.6, 352, 526/943

[56] References Cited

U.S. PATENT DOCUMENTS

| | | | |
|---|---|---|---|
| 4,522,987 | 6/1985 | Hogan et al. | 526/106 |
| 4,665,263 | 5/1987 | Smith et al. | 585/520 |
| 5,498,581 | 3/1996 | Welch et al. | 502/102 |
| 5,714,555 | 2/1998 | Chabrand et al. | 526/127 |
| 5,753,785 | 5/1998 | Reddy et al. | 526/75 |

OTHER PUBLICATIONS

Research & Development Report #9684–83, Nov. 22, 1983, "$^{13}$C NMR in Polymer Quantitative Analyses", by J. C. Randall and E. T. Hsieh.

Macromolecules 1999, 32, 6913–6916, "Branched Polyethylene by Ethylene Homopolymerization with meso–Zirconocene Catalyst", by Lorella Izzo, et al.

*Primary Examiner*—David W. Wu
*Assistant Examiner*—Caixia Lu
*Attorney, Agent, or Firm*—Edward L. Bowman

[57] ABSTRACT

The present invention provides polymers of ethylene having ethyl branches, a narrow molecular weight distribution, no substantial amount of branches longer than any comonomer employed in the polymerization, and an unusually low branching to density ratio. In one embodiment the polyethylenes are substantially free of any branches having more than 2 carbon atoms, i.e. ethyl branches, and the molar percent of ethyl branches is substantially the same for molecular fractions across the molecular weight distribution. In another embodiment the polyethylenes have other branches having 3 or more carbons and the molar percent of the ethyl branches is substantially the same for molecular fractions across the molecular weight distribution.

36 Claims, 4 Drawing Sheets

POLYETHYLENES CONTAINING A UNIQUE DISTRIBUTION OF SHORT CHAIN BRANCHING

This application is a continuation application of U.S. application Ser. No. 08/753,973, filed Dec. 4, 1996, now abandoned is a continuation-in-part of PCT application PCT/US96/13000 filed Aug. 8, 1996, which was a continuation-in-part of U.S. application Ser. No. 08/515,498, filed Aug. 15, 1995, which was converted into a provisional application, which was in turn a continuation-in-part of U.S. application Ser. No. 08/252,611 filed Jun. 1, 1994, which issued on Mar. 12, 1996 as U.S. Pat. No. 5,498,581.

FIELD OF THE INVENTION

This invention relates to polymers produced from a monomer consisting predominately of ethylene. In another aspect, the present invention relates to polyethylene having an unusual combination of clarity, density, molecular weight distribution, and short chain branching distribution.

BACKGROUND OF THE INVENTION

Various techniques have been developed for producing polymers consisting predominately of ethylene. The high pressure free radical process produces the polymer that has come to be known as low density polyethylene (LDPE) results in polymer chains having multiple branches many of which are indistinguishable from the main polymer chain. Techniques for low pressure polymerization have been developed using modifications of transition metal coordination catalyst systems such as those originally discovered by Ziegler and Natta. Such catalyst are capable of producing high density polyethylene (HDPE), i.e polyethylene having a density of greater than about 0.94 g/cc, medium density polyethylene (MDPE), and linear low density polyethylene (LLDPE), i.e. polyethylenes having densities generally no greater than about 0.925 g/cc in solution, gas phase, and slurry phase polymerizations. The phrase "transition metal coordination catalyst systems" is used to include catalyst system involving the combination of a transition metal compound of a metal such as Ti, V, and Zr used in combination with an organoaluminum cocatalyst, generally an organoaluminum alkyl.

Another technique for producing polyethylene involves the use of the Phillips chromium catalyst system.

The various types of polyethylenes find different applications as a result of differences in the structure of the polymer chains. For example it is generally recognized that LLDPE which have a density of no more than 0.925 g/cc are superior to HDPE in transparency, impact resistance, and environmental stress crack resistance (ESCR) and are superior to LDPE in impact resistance and creep resistance. Such LLDPE is however generally inferior to LDPE in transparency, melt processing, and melt elasticity. But LDPE on the other hand has lower ESCR and lower mechanical strength than LLDPE of similar density.

The various polymerization techniques for producing HDPE and LLDPE likewise result in polyethylene polymers having various types of polymer microstructure. The transition metal coordination catalyst systems generally produce polymer chains having varying lengths so that the polydispersity index, i.e. heterogenity index or molecular weight distribution, is generally greater than 4. The Phillips chromium catalyst systems generally produces polyethylenes having an even broader molecular weight distribution. When the chromium and transition metal coordination catalyst systems are employed for copolymerizing ethylene with alpha olefms containing 3 to 10 carbon atoms the distribution of the comonomer among the various polymer chains has been noted to also vary, i.e. the polymer chains can contain different levels of comonomer insertion and the distribution of the comonomer insertion within a given chain can also vary in chains of differing lengths. Particularly, it has been noted in the polymers produced with the chromium and transition metal coordination catalyst systems the comonomer insertion is much less in the longer polymer molecules. The phenomenon regarding the greater incorporation of comonomer in the lower molecular weight chains has also been documented in Exxon's U.S. Pat. No. 5,382,630, note especially column 1, lines 46–52; Hosoda, S., Polym. J., 20, 389 (1988): and Randal and Hsieh, NMR and Macromolecules, ACS Symposium Series 247, Chapter 9 (1984).

Also the copolymers produced using the Phillips Cr catalyst systems generally have significant amounts of terminal vinyl groups, i.e. about 1 vinyl end group for each saturated end group, whereas the polymers produced with the transition metal coordination catalyst systems of comparable MI generally have a ratio of terminal vinyl groups to saturated end groups of less than ¼, if they contain any terminal vinyl groups at all. These variances in the structure of the polymer chains can have significant effects on the physical properties of the polymer and thus can be of great importance to determining the applications for a particular polymer.

At a given $M_w$ and $M_w/M_n$ the density of LLDPE and HDPE polymers is primarily controlled by the introduction of short chain branches into the polymer. Some catalyst systems have been noted to result in the formation of branches without the employment of comonomer. More typically the short chain branches are introduced by the employment of a minor amount of an alpha olefin comonomer having 3 to 8 carbon atoms. The amount of comonomer incorporated is generally less than 20 mole percent, more typically less than 10 mole percent for the typical LLDPE. Obtaining lower densities involves introducing more short chain branches by using more comonomer. In order to obtain ethylene polymers having a density of about 0.915, it has been noted that for chromium catalysts and transition metal coordination catalyst systems typically the ratio between the mole percent of comonomer, as reflected by short chain branching in the polymer, to the density is at least about 5.

One object of the present invention is to provide polyethylenes that are particularly useful for making films of unusual clarity at a given density, said polyethylenes having a very narrow molecular weight distribution and no detectable amounts of long chain branching.

Another object of the present invention is to provide polyethylene having ethyl branches wherein the level of ethyl branches is substantially the same regardless of the molecular weight of the polymer molecules.

Another object of the present invention is to provide certain types of polyethylene having ethyl branches wherein the molar percent of ethyl branches is substantially the same for molecular fractions across the molecular weight distribution of the polymer. One type of such polyethylene is substantially free of any other type branches. Another type of such polyethylene has branches having 3 or more carbons while at the same time having ethyl branches wherein the molar percent of the ethyl branches is substantially the same for molecular fractions across the molecular weight distribution of the polymer. In a preferred embodiment the polyethylene is substantially free of branches having 6 or more carbon atoms.

Another object of the present invention is to provide certain polyethylene having significant amounts of terminal vinyl groups, a very narrow molecular weight distribution, and a lower density than one would normally expect for the amount of branching due to comonomer insertions in the polymer chains.

Another object of this invention is to provide certain narrow molecular weight polyethylenes having an unusually low its density for the amount of short chain branching at a given molecular weight.

Another object is to provide certain copolymers of ethylene wherein the copolymer is produced from olefins limited to ethylene and alpha olefin comonomers having either 3 or 5 or more carbon atoms per molecule.

Other aspects, objects, and advantages of the present invention will be apparent from the discussion which follows.

SUMMARY OF THE INVENTION

The present invention provides polymers of ethylene having ethyl branches, a narrow molecular weight distribution, no substantial amount of branches longer than any comonomer employed in the polymerization, and an unusually low branching to density ratio. In one embodiment the polyethylenes are substantially free of any branches other than ethyl branches, and the molar percent of ethyl branches for molecular fractions obtained by Solvent Gradient Fractionation (SGF) is substantially the same across the molecular weight distribution. In another embodiment the polyethylenes have other branches having one or 3 or more carbons and the molar percent of the ethyl branches for molecular fractions obtained by SGF is substantially the sa-me across the molecular weight distribution.

DETAILED DESCRIPTION OF THE INVENTION

The ethylene polymers of the present invention can be prepared using ethylene, either alone or with comonomers. In a preferred embodiment the comonomers are selected from propylene and other alpha olefins having 5 or more carbon atoms per molecule. The polymers are particularly unusual in that molar percent of ethyl branches is substantially the same for molecular fractions across the molecular weight distribution. This can be determined by subjecting the polymer to Solvent Gradient Fractionation (SGF) to obtain fractions having very narrow molecular weight distribution and then determining the mole percent of ethyl branches in the polymers of the various fractions using $C^{13}$ NMR.

Of particular interest are the polymers in which the mole percent of ethyl branches in the various molecular fractions obtained by SGF differ by no more than about 0.09 mole percent across the molecular weight distribution. Preferably, the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the Mz of the polymer is less than about 0.06 mole percent. Still more preferably the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the $M_w$ of the polymer is less than about 0.02 mole percent. (The phrase "about equal" as used in this paragraph means that the weight average molecular weight of the fraction is within 5 percent of the referenced item, e.g. within 5 % of the Mz of the polymer, for example. More preferably, the phrase means within 2 %.)

Also included within the scope of the invention are polymers of ethylene having a SGF fraction with MWD in the range of 1 to 1.5, a weight average molecular weight greater than the weight average molecular weight of the polymer, and a mole percent of ethyl branches within 0.06 mole percent of the mole percent of ethyl branches of the polymer. Also included are polymers having a SGF fraction with MWD in the range of 1 to 1.5, a weight average molecular weight about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of about one tenth of the weight average molecular weight of the polymer. Also included are polymers having a SGF fraction with MWD in the range of 1 to 1.5, a weight average molecular weight at least about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of no more than about 10,000.

A particularly preferred embodiment includes polyethylenes in which the molar percent of ethyl branches of fractions obtained by conducting Temperature Gradient Fractionation (TGF) on the SGF fractions is also substantially the same across the molecular weight distribution of the SGF fraction. Particularly preferred polymers of this invention are those wherein the mole percent of ethyl branches in fractions having MWD in the range of about 1 to about 1.5 obtained by SGF of the polymer differ by no more than 0.09 mole percent and the mole percent of ethyl branches obtained by TGF of the SGF fractions differ by no more than 0.09 mole percent.

Ethylene polymers of the present invention include those which have a narrow molecular weight distribution, i.e. a MWD in the range of about 1.5 to about 3, more typically in the range of about 2 to about 3, which are generally monomodal and generally have only one peak in their DSC curve. The inventive polymers thus include those having melting point of the in the range of about 100° C. to about 140° C. Particularly preferred polymers are those wherein the mole percent of ethyl branches in the range of about 0.1 to about 0.24. Typically the polymers have a density in the range of 0.9 to 0.956 g/cc. Some currently preferred polymers have densities in the range of 0.9394 to 0.9465, 0.9394 to 0.948, 0.94 to 0.945, 0.9179 to 0.945, 0.9179–0.926, and 0.9216–0.9256. Some preferred polymers include those having densities in the range of about 0.9394 to about 0.9465 and in which the ratio of the mole percent of short chain branches to density is less than 3. Other preferred polymers include those having densities in the range of about 0.9179 to about 0.945 and in which the ratio of the mole percent of short chain branches to density is less than 2.5, an even more preferred embodiment involves such polymers in which the density is in the range of 0.9179 to 0.9216 g/cc. Another preferred type of polymer has a density in the range of 0.9216 to about 0.9256 and the ratio of the mole percent of short chain branches to density is less than 1.5. Still another preferred type of polymer has a density in the range of 0.94 to 0.945 g/cc and the ratio of the mole percent of short chain branches to density is less than 0.5.

In preferred embodiments the ratio of the mole percent of ethyl branches to density is less than 3, more preferably less than 0.25, more preferably less than 0.15, and still more preferably less than 0. 15. Also preferred polymers have a ratio of mole percent of short chain branches to density of less than 2.5, more preferably less than 1.5, and still more preferably less than 0.5.

The molecular weight of the polymers can vary over a wide range, for example $M_w$'s in the range of 10,000 to 1,000,000 or more. The melt index of the polymers can also vary over a wide range. Inventive polymers having MI's in the range of about 0.01 to about 500 dg/min. are of particular interest, with those having MI's in the range of about 0.1 to about 20 dg/min. being especially useful in some applications, such as films.

Particularly inventive polymers include those having a HLMI/MI of less than 20.

If one prepares the polymers using only ethylene it is possible to obtain polymers having ethyl branches but no NMR detectable amounts of any larger branches. By using comonomers one can also introduce longer branches in addition to the ethyl branches. One preferred type of inventive polymer has no substantial amounts of long chain branches, i.e. branches having 6 or more carbon atoms. The inventive polymers thus include those in which the number of long chain branches per 1000 carbon atoms is less than 1, more preferably less than 0.2 per 1000 carbons. In especially preferred embodiments the number of such long chain branches is less than 0.01/1000 carbon atoms. Such polymers are characterized by rheological properties quite different than those of polymer having larger amounts of detectable long chain branching. Thus some of the inventive polyethylenes have flow activation energies of less than 25 kJ/mole and critical shear stress at the onset of melt fracture of less than $4 \times 10^6$ dyne/cm$^2$.

The inventive ethylene polymers include polymers having significant amounts of vinyl groups, i.e. those having at least 0.1 vinyl group per 1000 carbon atoms. Preferred inventive polymers have at least one vinyl group per chain. In particularly preferred inventive polymers the ratio of trans vinyl groups to terminal vinyl end groups is in the range of about 0.17 to about 0.7, or more preferably greater than 0.3, or still more preferably greater than 0.5.

The unusual ethylene polymers of the present invention can be obtained by polymerizing ethylene, and optionally a suitable alpha-olefin comonomer under particle form polymerization conditions using a special type of solid metallocene-based catalyst system that is substantially insoluble in the polymerization diluent under the polymerization conditions. The solid catalyst system can be obtained by (a) combining 5-(9-fluorenyl)-(5-cyclopentadienyl)-hexene-1 zirconium dichloride and methylaluminoxane in a liquid, (b) prepolymerizing ethylene in the resulting liquid, and (c) separating the resulting solid prepolymerized catalyst system from the liquid. The details of the preparation of such a catalyst are disclosed in U.S. Pat. No. 5,498,481, the disclosure of which is incorporated herein by reference. It is preferred that the liquid employed in step (a) be an organic liquid in which the methylaluminoxane is at least partially soluble. Preferably some aromatic solvent is employed in step (a). Examples of aromatic solvents include benzene, toluene, ethylbenzene, diethylbenzene, and the like. Preferably the amount of the liquid should be such as to dissolve the product of reaction between the metallocene and the aluminoxane, provide desirable polymerization viscosity for the polymerization, and to permit good mixing. During the mixing, the temperature would preferably be kept below that which would cause the metallocene to decompose. Typically the temperature would be in the range of about −50° C. to about 150° C. Preferably, the metallocene, the aluminoxane, and the liquid diluent are combined at room temperature, i.e. around 10° C. to 30° C. The reaction between the aluminoxane and the metallocene is relatively rapid. The reaction rate can vary over a wide range, however, it is generally desired that they be contacted for an amount of time in the range of about 1 minute to about 1 hour.

It is also within the scope of the invention to carry out the step (a) in the presence of a particulate solid. Any number of particulate solids can be employed. Examples include porous supports such as talc, inorganic oxides, and even particulate polyolefins. Typically this solid would be any inorganic solid that does not interfere with the desired end results. Examples of inorganic oxide materials include metal oxides of Groups II–V, such as silica, alumina, silica-alumina, and mixtures thereof. Other examples of inorganic oxides are magnesia, titania, zirconia, and the like.

If a solid is employed, it is generally desirable for the solid to be thoroughly dehydrated prior to use. Preferably it is dehydrated so as to contain less than 1 percent loss on ignition. Thermal dehydration may be carried out in a vacuum or while purging with a dry inert gas such as nitrogen at a temperature of about 20° C. to about 1000° C. and preferably from about 300° C. to about 870° C. Pressure considerations are not viewed as critical. The duration of the thermal treatment can be from about 1 to about 24 hours as needed.

Dehydration can also be accomplished by subjecting the solid to a chemical treatment in order to remove water and reduce the concentration of surface hydroxyl groups. Chemical treatment is generally capable of converting all water hydroxyl groups in the oxide surface to relatively inert species. Useful chemical agents are for example, carbon monoxide, carbonyl sulfide, trimethylaluminum, ethyl magnesium chloride, chloro silanes such as $SiCl_4$, disilazane, trimethylchlorosilane, dimethylamino trimethylsilane, and the like.

The amount of aluminoxane and metallocene used in forming a liquid catalyst system for the prepolymerization can vary over a wide range. Typically, however, the molar ratio of the aluminum and the aluminoxane to the transition metal of the metallocene is in the range of about 1:1 to about 20,000:1, more preferably a molar ratio of about 50:1 to about 2,000:1 is used. If a particulate solid, i.e. silica, is used, generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or gel in a liquid. A wide range of olefins can be used for the polymerization. Typically, however, the prepolymerization will be conducted using an olefin, preferably selected from ethylene and non-aromatic alpha olefins, such as propylene. It is within the scope of the invention to use a mixture of olefins, for example, ethylene and a higher alpha olefin can be used for the prepolymerization. The use of a higher alpha olefin, such as 1-butene, with ethylene, is believed to increase the amount of copolymerization occurring between the olefin monomer and the olefinically unsaturated portion of the metallocene.

The prepolymerization can be conducted under relatively mild conditions. Typically this would involve using low pressures of the olefin and relatively low temperatures designed to prevent sight decomposition resulting from high concentrations of localized heat. The prepolymerization typically occurs at temperatures in the range of about −15° C. to about +150° C., more typically in the range of about 0° C. to about +30° C. The amount of prepolymer can be varied but typically would be in the range of from about 1 to about 95 weight percent of the resulting prepolymerized solid catalyst system, still more preferably about 5 to about 80 weight percent. It is generally desirable to carry out the prepolymerization to at least a point where substantially all of the metallocene is in the solid rather than in the liquid, since that maximizes the use of the metallocene.

After the prepolymerization, the resulting solid prepolymerized catalyst is separated from the liquid reaction mixture. Various techniques known in the art can be used for carrying out this step. For example, the material could be separated by filtration, decantation, or vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from a liquid, the resulting solid is preferably washed with a hydrocarbon and dried using a high vacuum to remove substantially all the liquids or other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by a wash with a paraffinic hydrocarbon, such as hexane, and then the vacuum drying.

It is also within the scope of the present invention to add a particulate solid to the liquid catalyst system after it has been formed and then to carry out the prepolymerization in the presence of that solid. Another option is to add a particulate solid of the type aforementioned after the prepolymerization or after the solid prepolymerized catalyst system has been separated from the liquid.

This resulting solid prepolymerized catalyst system is capable of preparing polymers of ethylene having a fairly wide range of densities. Typically, in preparing the lower density versions, the ethylene is polymerized in combination with a smaller amount, generally no more than 20 mole percent, of at least one other alpha olefin having 3 or more carbon atoms, more generally containing about 5 to about 10 carbon atoms, examples of which include aliphatic hydrocarbons such as pentene-1, hexene-1, 4-methylpentene-1, octene-1, and the like. The solid prepolymerized catalyst system can be employed using slurry polymerization conditions. Typically the polymerization temperature would be selected so as to provide slurry polymerization conditions in the particular liquid diluent selected. Typically the temperature would be in the range of about 20° C. to about 160° C. With isobutane as the liquid diluent, temperatures in the range of about 50° C. to about 110° C. have been found desirable. For producing polymers for film applications, it is generally desirable to produce a polymer having a melt index of less than 5. This can be accomplished by adjusting the polymerization conditions and/or the molar ratio of hydrogen to ethylene in the polymerization process.

When the polymerization is carried out in a continuous loop slurry process, it is generally desirable to include in the reaction mixture a small amount of an antistatic agent. An example of such as antistatic agent is the material sold by DuPont Chemical Co. under the trade name Stadis 450.

A further understanding of the present invention and its objects and advantages will be provided by the following examples. In the discussion which follows various polymer properties will be discussed. For the purposes of this disclosure unless indicated otherwise the properties were determined as follows: density in grams/mL (ASTM D1505–68); Tm in degrees Celsius by ASTM D1693, High Load Melt Index (HLMI) in grams of polymer/10 minutes at 190° C. (ASTM D1238–86, Condition 190/21.6); Melt Index (MI) in grams of polymer/10 minutes at 190° C. (ASTM D1238–86, Condition 190/2.16); Shear Stress Response (SR) determined by dividing HLMI by MI; Molecular weights and Molecular Weight Distribution by size exclusion chromatography, i.e. weight average molecular weight referred to herein as $M_w$ and number average molecular weight referred to herein as $M_n$; and Heterogenity index (HI) or Polydispersibility (PD) or molecular weight distribution (MWD) being determined by dividing $M_w$ by $M_n$. The (SEC) size exclusion chromatography was conducted using a linear set of GPC/SEC columns capable of resolving a wide range of molecular weights generally observed in polyolefins, such as polyethylene. Percent Haze (ASTM D-1003 using an XL-211 Hazeguard system obtained from Garder/Neotec Instruments Division).

The concentrations of vinyl end groups and trans double bonds was determined using Fourier transform infrared spectroscopy (FTIR). In each case 0.1 gram of the polymer was pressed into a thin film of about 250 microns at 300° F. and an FTIR transmission spectrum was obtained using a Digilab FTS-40 spectrophotomer (2 cm-1 resolution at 32 scans). A calibration curve previously developed from a set of vinyl standards was used to calculate the terminal vinyl content from the absorbance at 909 cm-1. A relationship between the extinction coefficient for the vinyl C—H bending band and the trans C—H bending band was determined using high purity olefin standards. That relationship was then used to calculate the trans double bond content.

The property referred to herein as flow-activation energy, also sometimes referred to as energy of activation, i.e. Ea, reflects the sensitivity of a polymer melt viscosity to temperature. This is generally viewed as a function of the linear vs network character of the polymer. The molecular weight and the molecular weight distribution are also generally viewed as factors affecting the flow activation energy. The Ea in terms of kJ/mol can be readily determined from temperature dependant data obtained from a dynamic rheometer such as Rheometrics Inc. (RMS 800) dynamic rheometer. A standard prescription for summarizing the viscosity-temperature dependence of polymer melts has long been available in the scheme known as the Williams-Landel-Ferry (WLF) superposition which is described in the classic text entitled "Viscoelastic Properties of Polymers", 3rd Edition (John Wiley & Sons, New York, 1980) by John D. Ferry. Data needed for establishing the temperature dependence of dynamic viscosity versus frequency, or viscosity vs shear rate, are not difficult to obtain at various temperatures in a range between melting and the onset of chemical degradation. In order to ensure that the Ea values are most accurate, it is desirable to optimize the data to produce optimally smooth isothermal master curves according to the WLF time-temperature superposition but using a least squares closeness-of-fit criterion based on Carreau-Yasuda model parameters that have been shown previously to give highly precise fits to single temperature polyethylene data. This can be done in various ways. The currently preferred technique involves subjecting the dynamic viscosity frequency curves obtained from a Rheometrics, Inc. dynamic viscometer to a proprietary computer program entitled "Rheology Analysis Program CY" covered by Phillips Petroleum Company unpublished copyright which was filed for registration on Jan. 31, 1995. This proprietary computer program is available for use by others under a licensing program.

Discussions of the Carreau-Yasuada model can be found in *Dynamics of Polymeric Liquids*, Second Ed. (John Wiley & Sons, New York, 1987) by R. Byron Bird, Robert C. Armstrong, and Ole Hassager; as well in C. A. Hieber and H. H. Chiang, "Some correlations involving the shear viscosity of polystyrene melts," *Rheol. Acta,* 28, 321–332 (1989) and C. A. Hieber and H. H. Chiang, Shear-rate-dependence modeling of polymer melt viscosity, "*Polym. Eng. Sci.* 32. 031–938 (1992).

The content of methyl branches, ethyl branches, and the like was determined using the technique described in "Carbon 13 NMR In Polymer Quantitative Analysis" by J. C. Randall and E. T. Hsieh, Chapter 9, ACS Monograph No. 247, 1983. A method of determining long chain branching is disclosed in Randall, *Rev. Macromol. Chem. Phys.*, C29 (243), 285,297. The $C^{13}$NMR data were obtained using a Varian Unity 500 instrument. The carbon-13 spectral frequency was 125,699 MHZ. The instrument conditions were: probe temperature, 125° C.; broadband decoupling: pulse angle, 90°; pulse delay, 12 seconds; acquisition time, 3 seconds; spectral width, 8000 Hz; data points per spectrum, 48 K; double precision arithmetic; 5500 to 6000 transients per spectrum, corresponding to a signal-to-noise ratio of approximately 5,000 to 1. The probe was a high sensitivity 10 mm broadband probe.

Solvent Gradient Fractionation (SGF) is a technique for separating molecular fractions based upon the solubility of the molecules of different molecular weights in different solvents at a given temperature. Temperature Gradient Fractionation (TGF) is a technique for separating molecular fractions based upon the solubility of the molecules at different temperatures in a given solvent. Conducting a SGF and then subjecting fractions obtained from the SGF to TGF can be referred to as a Cross-Fractionation.

The fractionation column employed in the fractionations consisted of, from outside in, a thin metal shell, several layers of insulation material, and a jacketed stainless steel inner column packed with glass beads of mesh sizes from 60 to 80. Thermocouples were located near the top, the bottom, and in the middle, inside the inner column for monitoring the actual column temperature. A Lauda bath made by Brinkmann, Model K20, was used to handle the heating, cooling, and circulation of the ethylene glycol used as the heat exchange fluid. The fractionation column had a free volume of about 11 liters.

The procedure employed for SGF in the following examples involved dissolving 115 grams of the polymer in a 50/50 volume mixture of n-butyl cellosolve (BCS) and 1,2,4-trichlorobenzene (TCB) at 130° C. overnight. A proven antioxidant package was added to the solvent and mechanical stirring was minimized in order to minimize polymer chain degradation. The fractionation column was first filled with that solvent and preheated so that it was at the same temperature as the polymer solution. The polymer solution was then charged into the column from the top. The polymer solution was loaded into the mid-section of the column, and this was followed by the addition of 1.5 liters of the solvent so as to leave approximately 1.5 liters of solvent at both ends. At the completion of the loading of the polymer a slow cooling process was begun. The column temperature was decreased linearly from 130 to 80° C. at a rate of 0.5° C. per hour. The cooling rate was lowered to 0.25° C. per hour from 80° to 70° C. Then the column was allowed to cool to 40° C. naturally. The column was usually maintained at the lowest set temperature of this slow cooling step for at least about 24 hours before the polymer recovery was begun.

Then the column was overflushed with 100% BCS. The polymer in the recovered BCS was thus the polymer that remained dissolved in the 50/50 volume percent mixture after the slow cooling process. Then the temperature was increased to 130° C. with elution stops at 80°, 100°, and 130° C. These extra temperature stops with the poorest solvent usually allowed for further extraction of the lowest molecular weight components. After the fraction was taken at 130° C. the column the remaining steps involve elution with solvents having increased levels of TCB with the elutions being conducted at 130° C. The volume percent of TCB in the first step was 5 and it was increased in 5 volume per cent increments to 20, and then in 2.25 volume per cent increments to 30, and then in 1 volume percent increments to 38, and then in 0.5 volume percent increments to 43.5. Each new step involved replacement of the solution inside the column from the previous step with the fresh solvent of the next level of TCB. The displaced solvent would be the second wash of the previous step. The column was then allowed to equilibrate at the set temperature of 130° C. overnight with no solvent flow. Then fresh solvent of the same composition would be introduced for the second time the next morning, until the column was completely filled with fresh solvent. The displaced solvent would be the first wash of that step. The solutions from the two washes in each step were combined, cooled, mixed with twice the volume of acetone and filtered. The resulting polymer precipitate was then dried in a vacuum oven at 40° C. and weighed and then submitted for GPC and NMR analysis. At the end of the polymer recovery steps the column was thoroughly washed with pure TCB at 140° C. and any polymer recovered was similarly separated and submitted for GPC and NMR analysis.

A TGF of an SGF fraction can be carried out by dissolving 6 grams of the polymer of the SGF fraction in 800 mls of pure TCB at 130° C. The polymer is loaded onto a column having a free volume of 1.1 liter. In this case only one wash need be used for each step which uses 1.4 liters of fresh TCB. A total of 24 hours of thermal equilibration would be used at each set temperature for each step, including the time needed for the wash. Elutions would be performed at temperatures of 40°, 45°, 48°, 50°, 53°, 55°, 58°, 60°, 63°, 65°, 68°, 72°, 87°, and 140° C. The polymer in the various fractions would be recovered and subjected to GPC and NMR analysis.

EXAMPLES

Example I

In this synthesis 20.6 mL of cyclopentadiene and 11.7 mL of 5-hexene-2-one were dissolved in 100 mL of methanol. While cooling in ice 12.4 mL of pyrrolidine was added and the reaction mixture was stirred overnight at room temperature. Then 9.6 mL of glacial acetic acid was added. The reaction mixture was stirred for one half hour and then the solvent was evaporated in a vacuum. The residue was dissolved in 200 mL of diethyl ether and washed five times with 100 mL of water. The organic phase was filtered using a silica gel and dried over sodium sulfate. The solvent was evaporated in a vacuum. A yellow oil was recovered which was identified as 6-(3-butenyl)-6-methylfulvene.

A solution was prepared by dissolving 10 g of fluorene in 100 mL of THF and then this was slowly reacted with 37.6 mL of a 1.6 molar solution of n-butyllithium in hexane. This dark red solution was stirred overnight at room temperature. Then a solution was prepared by combining 8.8 g of 6-(butenyl)-6-methylfulvene with 50 mL of THF. This solution was then added dropwise over a period of one half hour to the solution of the fluorenyl lithium salt. That reaction mixture was stirred overnight at room temperature and then 100 mL of water was added. The organic phase was dried overnight over sodium sulfate and the solvent was evaporated in a vacuum. The yellow residue was dissolved in pentane and filtered using silica gel. The solvent was concentrated by means of evaporation. Crystallization took place at about −18° C. to give 5-(cyclopentadienyl)-5-(9-fluorenyl)-1-hexene in the form of a white solid. This compound is also sometimes referred to as 1-(9-fluorenyl)-1-(cyclopentadienyl)-1-(butene-1) methane.

Example II

Five grams of compound 5-(cyclopentadienyl)-5-(9-fluorenyl)-1-hexene was reacted with twice as many moles of n-butyllithium in 100 mL diethylether using conditions of the type taught in published U.S. Pat. No. 5,436,305 to produce the divalent ligand salt. The divalent ligand salt in diethyl ether was then reacted with 3.96 grams of zirconium tetrachloride at room temperature. The orange metallocene 1-(9-fluorenyl)-1-(cyclopentadienyl)-1-(but-3-enyl)-1-(methyl) methane zirconium dichloride was recovered and purified by decanting off the liquid and recrystallization in dichloroethane at −18° C. Then the liquid was decanted off and the solid dried using a high vacuum.

The effectiveness of this metallocene for the polymerization of ethylene was evaluated. A comparative polymerization technique involved combining a selected amount of the metallocene with a 1.1 molar solution of methylaluminoxane (MAO) in toluene obtained from Schering. This resulting catalyst system solution was then injected into an autoclave. The autoclave was then filled with 2 liters of isobutane and the temperature was raised to about 90° C., the polymerization temperature. Then hydrogen was added from a 300 cc vessel in an amount equal to a 10 psi pressure drop in the vessel and then the reactor was then pressurized to 450 psig with ethylene. The polymerization was continued for one hour after reaching a total pressure of 450 psig. Then the reactor was cooled and vented and the solid polymer was recovered.

In another series of runs, a number of solid prepolymerized catalyst systems were prepared by combining the metallocene and the methylaluminoxane toluene solution to produce a liquid catalyst system which was then contacted with ethylene under prepolymerization conditions to produce a solid prepolymerized catalyst system. For example, 19.3 mL of a 1.1 molar toluene solution of methylaluminoxane was combined with 0.102 gms of the metallocene to result in the liquid catalyst solution.

A first solid prepolymerized catalyst system was prepared by adding 2 mL of the liquid catalyst solution to 38 mL of toluene; then ethylene was bubbled through the solution for 105 min at room temperature to effect prepolymerization. Then 40 mL of hexane was added to the mixture and the resulting mixture was filtered. The resulting solid was then washed with 10 mL of hexane and dried. The drying involved subjecting the recovered powder to a high vacuum for one hour.

A second solid prepolymerized catalyst was prepared by combining 2 mL of the liquid catalyst solution with 32 mL of toluene and 6 additional mL of the Schering methylaluminoxane solution. The prepolymerization and recovery of the solid catalyst was carried out in the same manner as before.

A third solid prepolymerized catalyst was prepared by combining 2 mL of the liquid catalyst solution with 26 mL of toluene and an additional 12 mL of the commercial Schering methylaluminoxane solution. The prepolymerization and recovery of the solid prepolymerized catalyst was as described for the first solid catalyst system.

Still another solid prepolymerized catalyst system was prepared by combining 2 mL of the liquid catalyst solution with 20 mL of toluene and an additional 18 mL of the commercial methylaluminoxane solution. Again, the prepolymerization and recovery of this solid catalyst system was as described before.

Still yet another solid prepolymerized catalyst system was prepared by combining 2 mL of the liquid catalyst solution with 3 8 mL of the commercial methylaluminoxy toluene solution. Again the prepolymerization and isolation of the solid catalyst was carried as described before.

All of these prepolymerized solid catalyst systems were then evaluated for the polymerization of ethylene. In these runs, a hexane slurry of the solid prepolymerized catalyst was subjected to sonification and then added to the reactor which was then filled with isobutane. Hydrogen was added as was done in the comparative run. The reactor was then pressurized with ethylene and the temperature raised to conduct the prepolymerization as done in the comparative run. A comparison of the variables involved and the results obtained are set forth in the following table.

TABLE I

| Catalyst | Al/Zr | gPE/g | MI | SR | Density* | Density** |
|---|---|---|---|---|---|---|
| (Solution) | 965 | 1170 | 0.43 | 41 | 0.9543 | 0.9575 |
| 1 | 100 | 6880 | 0.91 | 20 | 0.9453 | 0.9457 |
| 2 | 400 | 836 | 0.65 | 19 | 0.9451 | 0.9467 |
| 3 | 700 | 9840 | 0.93 | 17 | 0.9445 | 0.9448 |

TABLE I-continued

| Catalyst | Al/Zr | gPE/g | MI | SR | Density* | Density** |
|---|---|---|---|---|---|---|
| 4 | 1000 | 5970 | 0.67 | 21 | 0.9449 | 0.9464 |
| 5 | 2000 | 7230 | 0.74 | 19 | 0.9443 | 0.9454 |

*Observed Density
**Density Corrected to an MI of 1.

The data demonstrate that a different type of polymer is obtained when the metallocene is used as a soluble catalyst system than when it is used as an insoluble prepolymerized catalyst system. The polymer produced with the solution form of the catalyst system produced a polymer having an HI of about 6, a higher shear response (SR), i.e. HLMI/MI, and a higher density than the polymers produced using the solid prepolymerized catalyst system. It was particularly interesting that the solid prepolymerized catalyst system produced polymers having such significantly lower densities since all the polymerizations were homopolymerizations.

Example III

Another batch of the solid prepolymerized catalyst system was prepared from the metallocene 1-(9-fluorenyl)-1-(cyclopentadienyl)-1-(but-3-enyl)-1-(methyl) methane zirconium dichloride. The technique of preparing the solid catalyst system was analogous to that used in preparing the solid catalyst systems of Example II. Then polymerizations were conducted in the same general manner as employed for the solid prepolymerized catalyst systems of Example II to produce polymers of ethylene having varying melt index values. No comonomer was employed. The recovered polymers were evaluated using NMR spectroscopy to determine whether ethyl branches were present. The results are summarized in the following table.

TABLE II

| Polymer | MI | Density | Ethyl Branches |
|---|---|---|---|
| 1 | 0.194 | 0.9394 | 0.14 |
| 2 | 0.214 | 0.9406 | 0.14 |
| 3 | 0.432 | 0.9418 | 0.14 |
| 4 | 1.11 | 0.9464 | 0.15 |

The densities reported in Table II are the observed densities. As in Example II the polymers produced with the solid catalyst system had observed densities that were much lower than one would expect for a homopolymer of ethylene of equivalent melt index. The NMR analysis revealed that, in fact, the polymers contained 0.14 to 0.15 mole percent ethyl branches.

Figure 3:
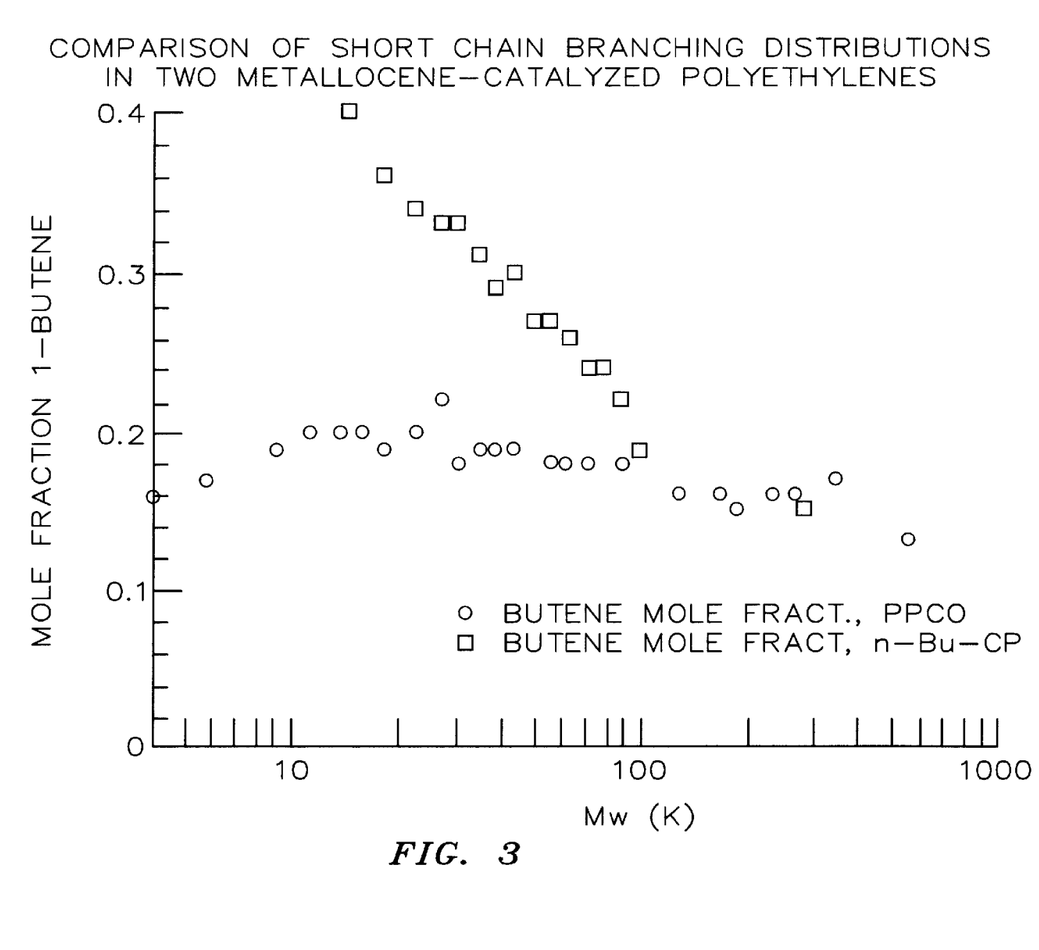
FIG. 3 is a plot comparing how the mole percent of ethyl branches, plotted as mole fraction of equivalent butene incorporation, varies for the SGF fractions for the polymers of FIGS. 1 and 2.

A polymer produced with typical multi-site transition metal coordination type catalysts that had such a low level of comonomer would have a density of about 0.956 g/cc when its melt index was about 1 dg/min. Or stated differently a polymer produced with a conventional multi-site transition metal coordination type catalyst would have to have about 0.6 mole percent butene incorporation, i.e. ethyl branches, in order to have a density of about 0.944 when its melt index was 1 dg/min. For discussions of how melt index influences density see U.S. Pat. No. 3,645,992, particularly FIG. 3 and U.S. Pat. No. 4,084,540, column 2, lines 11–24.

Example IV

A large batch of solid particulate metallocene-based catalyst was prepared. The preparation involves reacting the metallocene 1-(but-3-enyl)-1-(cyclopentadienyl)-1-(9-fluorenyl)-1-(methyl) methane zirconium dichloride which is also known as 5-(cyclopentadienyl)-5-(9-fluorenyl) hex-1-ene zirconium dichloride with a 10 weight percent solution of methylaluminoxane in toluene to give a soluble olefin polymerization catalyst system. Davison 948 silica which had been dried thermally and by treating with trimethylaluminum (TMA) was added to the liquid catalyst system. To heterogenize this system the final end group of the metallocene was copolymerized with ethylene. The resulting slurry was stirred well and ethylene was added to maintain a pressure in the reaction vessel at 3 to 4 psig while the temperature was maintained at about 20° C. After about two hours, the ethylene addition was stopped and the slurry was filtered. The solid was washed with toluene and then with hexane and dried overnight using a membrane pump until no more solvent condensed on the condenser. The resulting pink powder was dried an additional 5 hours on a high vacuum. The solid was sieved through a 60 mesh screen and combined with Cabosil HS-5, a fumed silica, which had been dried thermally and by treating with TMA.

The resulting solid metallocene-based catalyst system was then employed in a pilot plant scale continuous loop reactor under slurry type polymerization conditions. The feedstocks to the reactor were passed through alumina drier beds prior to being sent to the reactor. The reactor was a pilot plant scale pipe loop reactor. Circulation was achieved by a vari-speed motor attached to a propeller. Reactant concentrations were monitored by flash gas analysis using two on-line gas chromatographs.

The polymerizations were conducted in isobutane as a liquid diluent using varying amounts of ethylene and hexene-1 comonomer to obtain a number of lots of polyethylene fluff. Copolymers of ethylene and hexene-1 having densities varying from 0.9179 to 0.9402 were produced using the solid metallocene based catalyst system. The polyethylene copolymers of various densities were compounded with a typical stabilization package comprising 0.06 weight percent Irganox 1010, 0.12 weight percent PEP-Q, and 0.05 weight percent zinc stearate based upon the weight of the polymer.

The resulting polymers were then evaluated for various physical properties and were employed in the production of films using a 4 inch Sano blown film line having a 1.5 inch single screw extruder. The film die is a spiral mandrel die with four entry ports and is 4 inches in diameter. The die had a dual lip air ring mounted on it which was used to cool and stabilize the extruded bubble. Film blowing parameters were employed that are typical of linear-low density polyethylene type processing conditions, including a 0.06 inch die gap, 190° C. extruder barrel and film die set temperatures, 2.5:1 blowup ratio, no stalk, i.e. "in-pocket extrusion" in 1 mil film thickness. The screw rotation was adjusted to keep the extrusion rate between 55 and 60 pounds per hour, so that the film properties so obtained would scale directly (i.e., be the same as or at least very similar) with those obtained from larger, commercial scale equipment.

For some of the polyethylene copolymers runs were also made where the copolymer had been compounded with 0.07 weight percent of FX-9613 fluoropolymer. As controls films were also produced using the commercially available Dow 2045A octene copolymer, which is believed to be a linear low density polyethylene copolymer produced using a non-metallocene titanium-based catalyst system. Also, films were made using a copolymer produced by a Phillips chromium based catalyst.

A summary of the polyethylene properties and the properties of selected films is shown in the following table.

|  | Polyethylene Properties | | | Film Properties | | | | |
| --- | --- | --- | --- | --- | --- | --- | --- | --- |
|  |  |  |  | MD | | | | |
| Film | density g/cc | MI | MWD | Dart, g | Tear, g | TD Tear, g | Haze, % | Gloss, % |
| 1A | 0.9179 | 1.06 | 2.17 | 388 | 200 | 398 | 4.06 | 119.7 |
| 1B | 0.9179 | 1.06 | 2.17 | 708 | 299 | 429 | 3.73 | 134.3 |
| 2A | 0.9216 | 1.36 | 2.24 | 169 | 237 | 411 | 5.9 | 111.5 |
| 3A | 0.9222 | 1.89 | 2.21 | 256 | 253 | 429 | — | — |
| 3B | 0.9222 | 1.89 | 2.21 | 145 | 174 | 453 | 5.66 | 118.2 |
| 4A | 0.9256 | 0.98 | 2.31 | 153 | 170 | 422 | — | — |
| 4B | 0.9256 | 0.98 | 2.31 | 152 | 222 | 355 | — | — |
| 5A | 0.9402 | 0.87 | 2.31 | 30 | 19 | 147 | — | — |
| 5B | 0.9402 | 0.87 | 2.31 | <30 | 24 | 168 | 5.74 | 121.4 |
| Dow 2045 | 0.9200 | 1.00 | 4.17 | 216 | 461 | 755 | 17.8 | — |
| Cr Resin | 0.9230 | — | 24.0 | — | — | — | 27.08 | 30 |

The inventive polymers had weight average molecular weights in the range of 80,000 to 105,000 and contained both ethyl and butyl branches. The amount of ethyl branches in the polymers was in the range of from about 0.1 to about 0.16 mole percent. The amount of butyl branches in the polymers was in the range of from about 0.18 to about 2.1 mole percent.

The copolymers produced using the metallocene-based catalyst system have some distinct differences from the Dow 2045A polymer and the polymer produced using a Phillips chromium catalyst. Specifically, the polymers produced using the solid prepolymerized metallocene-based catalyst system had molecular weight distributions in a range of 2.17 to 2.31 and unusually low melting points for their density. The Dow polymer had a broader molecular weight distribution. The polymer produced using a Phillips chromium catalyst had a molecular weight distribution that was even broader than that of the Dow polymer.

In addition, the SR or HLMI/MI for the polymers produced using the metallocene-based catalyst were in the range of 17 to 18 whereas the Dow resin was 30. From temperature dependent Theological data and Carreau-Yasuda parameters at 190° C., the flow activation energies of the polymers were compared. The polymers produced from the metallocene-based system had flow activation energies in the range of 20.48 to 23.71 kJ/mol. The Dow 2045A polymer in contrast had a flow activation energy, Ea, of 25.47 kJ/mol.

The metallocene-based polymers were also evaluated to determine the concentration of terminal vinyl groups. The percent of chains with a terminal vinyl were in the range of 30 to about 42.9 percent, a value which is somewhat lower than that normally observed for copolymers produced using chromium type catalysts. As determined by FTIR spectroscopy, the total branching of the metallocene produced resins varied from about 0.4 to about 2.1 mole percent. The number of vinyl groups per 1000 carbon atoms for the metallocene based resins as determined by FTIR was in the range of 0.087 to 0.145.

In the above table if there is an A after the film number, it refers to a film prepared without any fluoroelastomer, whereas if there is a B after the number, it refers to a film produced using a polymer containing 0.07 weight percent fluoroelastomer. No fluoroelastomer was used in the control runs where films were produced from the Dow resin and the Phillips chromium resin.

The table demonstrates that in some cases the addition of fluoropolymer improved the dart impact strength. It is important to note that the polymer films remained relatively clear even with a metallocene-based polymer having a density as high as 0.9402 g/cc. The film from the 0.9402 g/cc density metallocene based resin was much clearer and smoother than the film of the resin with lower density that was produced with a Phillips chromium catalyst. While the metallocene resin having a density of 0.9402 g/cc had somewhat lower values for dart impact and tear resistance, the fact still remains that the copolymer produced using the metallocene is capable of producing very clear films at densities much higher than that normally employed in making films. In addition films made from the higher density resins have the additional property of greater stiffness than the films made from lower density polymer, a definite advantage in some applications.

It was further noticed that the films produced from the lower density metallocene based resins, i.e. those having a density of less than 0.925 g/cc exhibited significant friction in the wooden take-up slats. In addition, the tackiness and blocking decreased as resin density increased. Accordingly, for the best balance of processing and clarity properties, the metallocene produced resins having a density of at least about 0.925 g/cc were preferable. Additional runs were made that demonstrated that it was possible to produce 0.5 mil films using the special polyethylene copolymers having a density of at least about 0.925 g/cc and a narrow molecular weight distribution.

Example V

In this Example a copolymer of ethylene and 1-butene is prepared using a more conventional metallocene catalyst system so that the distribution of the ethyl branches of a polymer produced with that catalyst could be compared to the distribution of the ethyl branches in a polymer produced when ethylene alone is polymerized using a solid prepolymerized metallocene-based catalyst system of the type used in Examples II–IV.

CATALYST PREPARATION

A 30% solution of MAO in toluene, obtained from Albemarle Corporation was dried under high vacuum. In a 300 mL flask 15g of this dry MAO was redissolved in toluene. In a separate 50 mL vial, 0.75g (MeOBO)$_3$ was dissolved in 25 mL of toluene. This solution was then added to the 300 mL flask containing the MAO in a 15 minute period and allowed to stir overnight. After sitting in the dry box for 48 hours, the solids were filtered and dried under high vacuum.

To a 100 mL vial, log of the solid MAO product was charged along with 50 mL of toluene and sonocated for 30 minutes. Next 200 mg of bis(n-butylcyclopentadienyl) zirconium dichloride was added and the mixture stirred for an additional hour. Next 20 g of silica, which had been treated with trimethylaluminum, was placed in a beaker in the dry box and the above solution was added slowly with stirring. Last, the slurry was placed into a 300 mL flask and dried under high vacuum yielding the dry catalyst. This resulted in a supported metallocene catalyst system of the type disclosed in Phillips Petroleum Company's U.S. Pat. No. 5,411,925. It will be referred to herein as Catalyst B.

BUTENE-ETHYLENE COPOLYMERIZATION

Into a dry one gallon Autoclave Engineers stainless steel autoclave fitted with a thermowell, gas inlet, and stirrer was charged 0.0605g of Catalyst B and two liters of isobutane was introduced with nitrogen pressure. Heating was then started and ethylene was introduced. When the temperature reached 80° C., 3 g of 1-butene was added. Ethylene and hydrogen were added and the pressure maintained at 384 psi total at 80° C. for one hour. The reaction was terminated by venting the reactor. The solid was dried under a nitrogen stream and 55.1 g of polymer was recovered. Melt index and HLMI were then determined on the polymer with part of the remainder being sent for fractionation and NMR analysis. The polymer had a $M_w$ of 110,000 and an $M_n$ of 42,100 for a MWD of 2.61. The MI of the polymer was 0.73 dg/min and its density was 0.9415 g/cc. It contained 0.23 mole percent ethyl branches.

Figure 1:
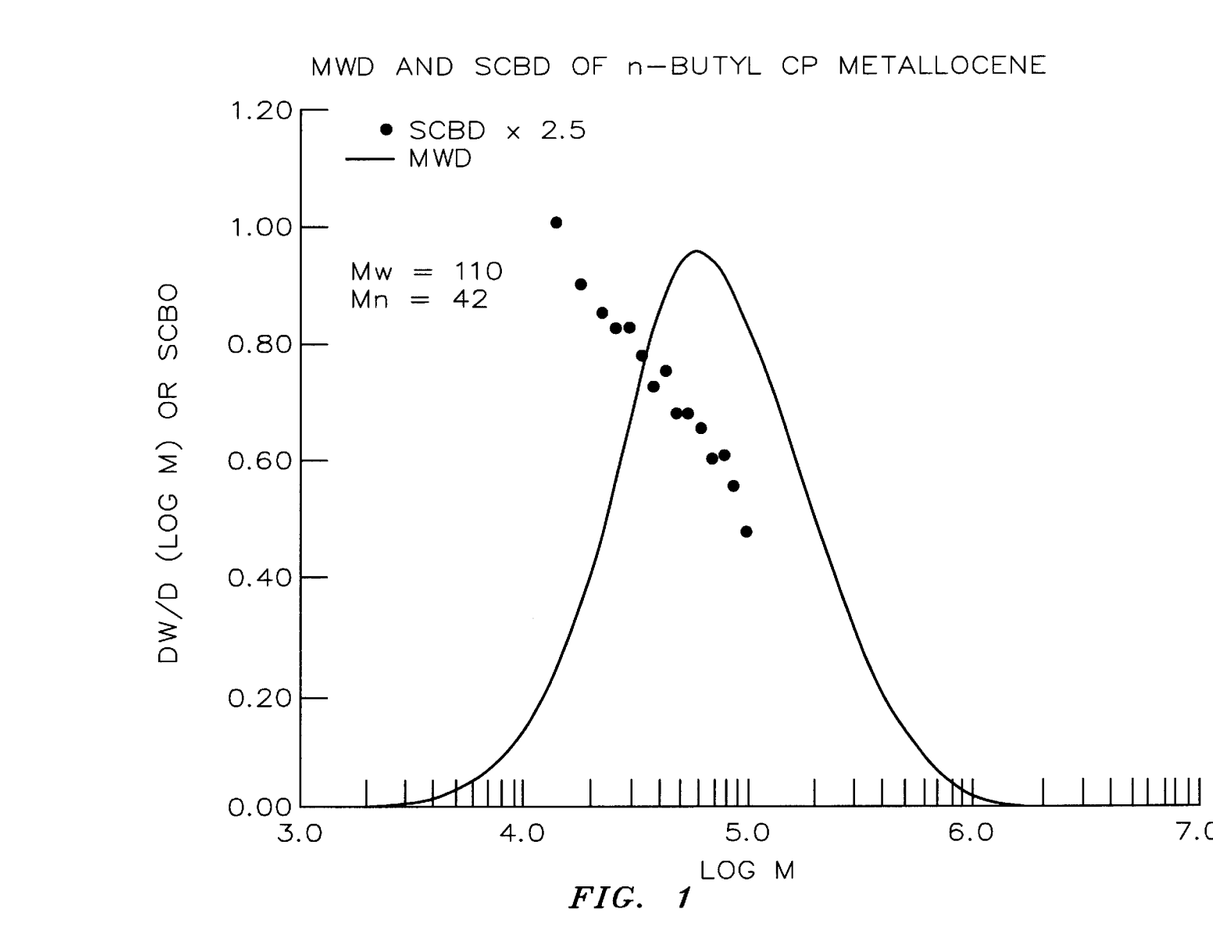
FIG. 1 is a plot showing how the mole percent of ethyl branches in SGF fractions varies across the molecular weight distribution for a ethylene/butene copolymer produced using a typical prior art type metallocene catalyst.

The polymer was separated into a number of fractions of very narrow MWD across the molecular weight distribution using Solvent Gradient Fractionation. The fractions had MWD's in the range of 1 to 1.5. The results of $C^{13}$NMR analysis of various fractions of the polymer revealed that the mole percent of ethyl branches decreased as the length of the polymer chains increased, i.e. the same sort of effect that has been noted in the past for comonomer incorporation when coordination type catalysts or Cr catalysts were employed in copolymerizations. The results of the analysis of ethyl branch distribution for the various fractions and their relation to MWD for this polymer are presented in FIGS. 1 and 3.

Example VI

A solid prepolymerized catalyst of the type used in Example IV was used to carry out homopolymerization of ethylene in a pilot plant scale continuous loop reactor under slurry loop reactor conditions. The polymer obtained had some properties in common with the ethylene/butene copolymer produced in Example V, specifically it contained 0.19 mole percent ethyl branches even though no butene comonomer was employed. The polymer also had a weight average molecular weight ($M_w$) of 111,000 and an $M_n$ of 41,400 for a MWD of 2.68. The MI of the polymer was 0.74 dg/min and its density was 0.9432 g/cc. It contained 0.19 mole percent ethyl branches. There was no evidence of any longer branches.

Figure 2:
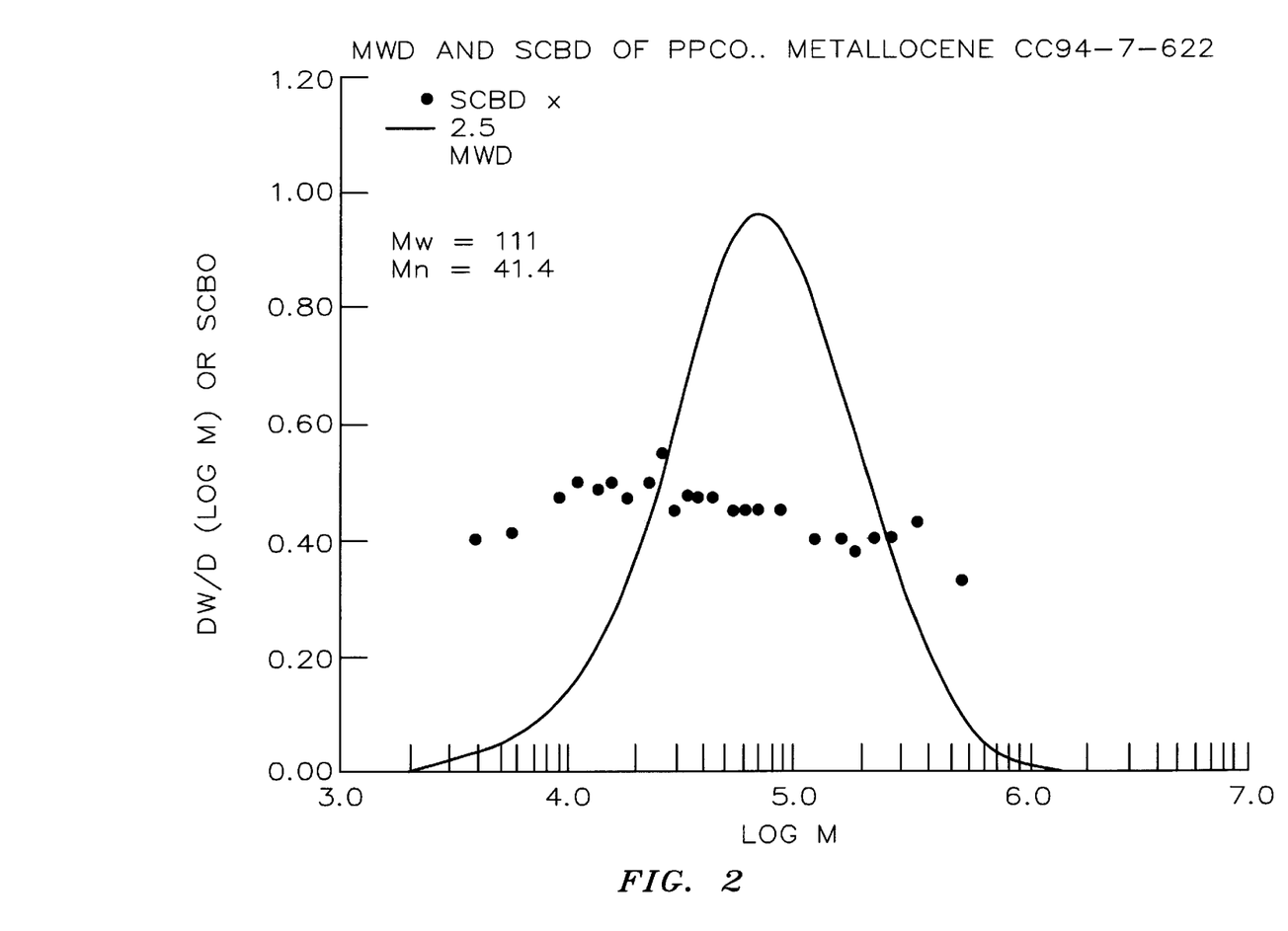
FIG. 2 is a plot showing how the mole percent of ethyl branches in SGF fractions varies across the molecular weight distribution for an inventive polymer having a level of ethyl branches similar to the polymer of FIG. 1 but produced with a different type of metallocene catalyst system.

This polymer was subjected to Solvent Gradient Fractionation in the same manner employed on the polymer of Example V. The results of the analysis of ethyl branch distribution for the various fractions and their relation to MWD for this polymer are presented in FIGS. 2 and 3. In this case the ethyl branch distribution was substantially the same for all fractions across the molecular weight distribution, which is quite different than the result obtained for the polymer of Example V. A further comparison of the different types of ethyl branching distribution in the polymers obtained in Examples V and VI is provided in FIG. 3. The mole percent of ethyl branches, reported in the Figure as the apparent mole percent of butene, was similar for both polymers. However, in the polymer of Example V the fractions in lower molecular weight end had much higher levels of the ethyl branches, a result which is analogous to that often observed for comonomer incorporation for Chromium or transition metal coordination catalyst systems. In the inventive polymer of Example VI on the other hand the mole percent of ethyl branches was substantially the same for all fractions across the molecular weight distribution.

Example VII

Figure 4:
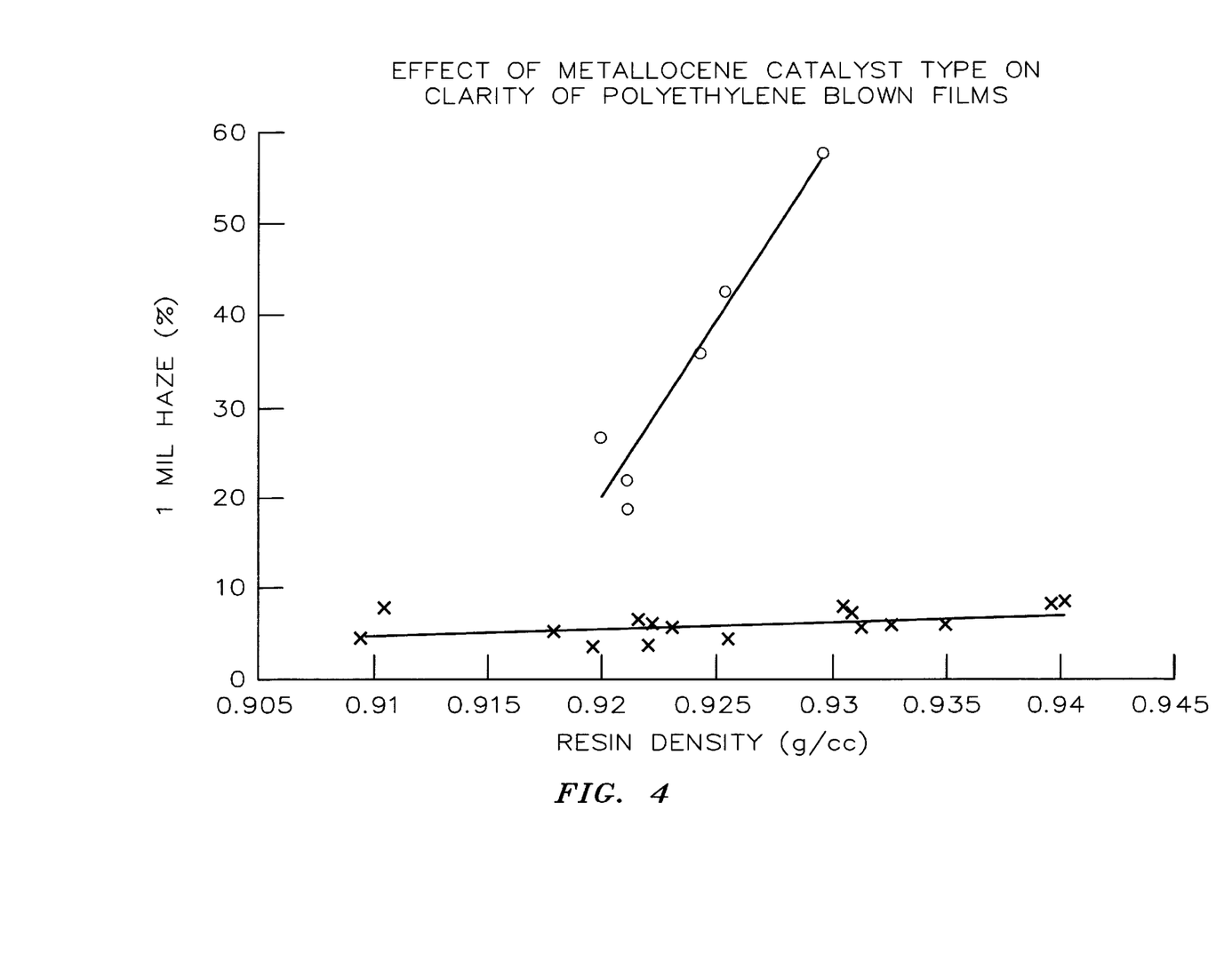
FIG. 4 is a plot comparing the difference in clarity of a hexene/ethylene copolymer prepared with a prior art metallocene and an inventive hexene/ethylene copolymer prepared with a different type of metallocene catalyst system.

Using a catalyst of the type disclosed in Example V a series of 1-hexene/ethylene copolymers were prepared in a pilot plant scale continuous loop reactor. The resulting polymers were then employed in the production of films using procedures of the general type disclosed in Example IV. A comparison of the clarity of 1 mil films produced with those polymers and 1 mil films of 1-hexene/ethylene copolymers produced using a catalyst of the type disclosed in Example IV is provided by FIG. 4 wherein the % haze is plotted versus density with the values represented by circles being the values for polymers produced using the catalyst of the type disclosed in Example V and the values represented by x's being the values for polymer produced using the type of catalyst disclosed in Example IV. The figure clearly shows that at a given density the 1-hexene/ethylene copolymer produced using the catalyst of Example IV is significantly clearer than the 1-hexene/ethylene copolymer produced using the catalyst of Example V. As both resins had a narrow molecular weight distribution it is speculated that the difference in clarity is due to the difference in the distribution of the ethyl branches in the polymers.

That which is claimed is:

1. A polymer of ethylene and optionally one or more other comonomers, characterized by having a molecular weight distribution of no more than 3, having ethyl branches, having an ASTM D1238–86, Condition 190/2.16 melt index in the range of 0.1 to 2 dg/min, being substantially free of branches having 6 or more carbon atoms, further characterized by the fact that when the polymer is fractionated by SGF to give SGF fractions having molecular weight distributions in the range of 1 to 1.5, the mole percent of ethyl branches in the SGF fraction differ by no more than 0.09 mole percent and by the fact that when the SGF fractions are fractionated by TGF the mole percent of ethyl branches in the TGF fractions differ by no more than 0.09 mole percent.

2. A polymer according to claim 1 having a molecular weight distribution in the range of about 2 to about 2.5.

3. A polymer according to claim 2 having a $C^{13}$NMR spectra having no detectable amounts of branches other than ethyl branches.

4. A polymer according to claim 3 having an ASTMD 1238–86, condition MI in the range of 190/2.16 about 0.1 to about 2 dg/min.

5. A polymer according to claim 4 wherein the mole percent of ethyl branches is in the range of about 0.1 to about 0.24.

6. A polymer according to claim 5 having a density in the range of about 0.9394 to about 0.9465 g/cc and the ratio of mole percent ethyl branches to density is less than 0.3.

7. A polymer according to claim 6 wherein the ratio of mole percent ethyl branches to density of less than 0.25.

8. A polymer according to claim 6 wherein the ratio of mole percent ethyl branches to density of less than 0.15.

9. A polymer according to claim 8 wherein the density is in the range of 0.9394 to 0.9418.

10. A polymer according to claim 9 having an HLMI/MI of less than 20.

11. A polymer according to claim 6 having an HLMI/MI of less than 20.

12. A polymer according to claim 1 wherein the amount of comonomer incorporated is no greater than 10 mole percent.

13. A polymer according to claim 12 wherein the polymer contains branches consisting essentially of ethyl and butyl branches and has a density in the range of from about 0.9 to about 0.956 and has less than 1 long chain branch per 1000 carbon atoms.

14. A polymer according to claim 13 wherein the density is in the range of from about 0.9179 to about 0.945, the ratio of mole percent of short chain branches to the density is less than 2.5, the D11238–96 condition 190/2.16 MI is in the range of about 0.5 to about 2 dg/min, and the mole percent of ethyl branches is in the range of about 0.1 to about 0.16.

15. A polymer according to claim 14 wherein the density is in the range of 0.9179 to 0.9216 g/cc.

16. A polymer according to claim 14 wherein the density is in the range of 0.9216 to about 0.9256 and the ratio of the mole percent of short chain branches to the density is less than 1.5.

17. A polymer according to claim 14 wherein the density is in the range of 0.94 to 0.945 g/cc and the ratio of the mole percent of short chain branches to the density is less than 0.5.

18. A polymer according to claim 14 having a HLMI/MI of less than 20.

19. A polymer according to claim 12 having a HLMI/MI of less than 20.

20. A polymer according to claim 3 wherein the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the Mz of the polymer is less than 0.06 mole percent.

21. A polymer according to claim 3 wherein the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the $M_w$ of the polymer is less than 0.02 mole percent.

22. A polymer according to claim 3 wherein the mole percent of ethyl branches in the various molecular fractions obtained by SGF differ by no more than about 0.09 mole percent across the molecular weight distribution.

23. A polymer according to claim 3 having a trans vinyl to terminal vinyl ratio in the range of 0.17 to 0.7.

24. A polymer according to claim 13 wherein the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the MN of the polymer is less than 0.02 mole percent.

25. A polymer according to claim 24 having a trans vinyl to terminal vinyl ratio in the range of about 0.17 to 0.7.

26. A polymer according to claim 1 containing 0.1 to 0.24 mole percent ethyl branches.

27. A polymer according to claim 26 having a $C^{13}$NMR spectra having no detectable amounts of branches other than ethyl branches.

28. A polymer according to claim 26 containing branches consisting essentially of ethyl and butyl branches.

29. A polymer according to claim 1 containing zirconium.

30. A polymer according to claim 1 having a trans vinyl to terminal vinyl ratio of more than 0.5.

31. A polymer according to claim 13 wherein the mole percent of ethyl branches in the various molecular fractions obtained by SGF differ by no more than about 0.09 mole percent across the molecular weight distribution.

32. A polymer of ethylene having ethyl branches further characterized by the fact that when the polymer is fractionated by SGF to give SGF fractions having molecular weight distributions in the range of I to 1.5, the mole percent ethyl branches in the SGF fraction differ by no more than 0.09 mole percent and by the fact that when the SGF fractions are fractionated by TGF, the mole percent of ethyl branches in the TGF fractions differ by no more than 0.09 mole percent.

33. A polymer according to claim 32 containing ethyl branches in an amount in the range of about 0.1 to about 0.24 mole percent.

34. A polymer of ethylene according to claim 32 having a SGF fraction which has a MWD in the range of 1 to 1.5, a weight average molecular weight greater than the weight average molecular weight of the polymer, and a mole percent of ethyl branches within 0.06 mole percent of the mole percent of ethyl branches of the polymer.

35. A polymer according to claim 34 having a SGF fraction which has a MWD in the range of 1 to 1.5, a weight average molecular weight about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of about one tenth of the weight average molecular weight of the polymer.

36. A polymer according to claim 34 having a SGF fraction with MWD in the range of 1 to 1.5, a weight average molecular weight at least about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of no more than about 10,000.

* * * * *